United States Patent [19]

Andrei-Alexandru et al.

[11] Patent Number: 4,652,781
[45] Date of Patent: Mar. 24, 1987

[54] DRIVE UNIT FOR ADJUSTING WINDOW PANES, SUNROOFS, SEATS AND SIMILAR MOTOR VEHICLE PARTS

[75] Inventors: Marcel Andrei-Alexandru, Bietigheim-Bissingen; Wolfgang Kofink, Aichwald-Lobenrot; Hans Prohaska, Bietigheim-Bissingen, all of Fed. Rep. of Germany

[73] Assignee: SWF Auto-Electric GmbH, Bietigheim-Bissingen, Fed. Rep. of Germany

[21] Appl. No.: 777,823

[22] Filed: Sep. 19, 1985

[30] Foreign Application Priority Data

Sep. 22, 1984 [DE] Fed. Rep. of Germany ....... 3434905

[51] Int. Cl.[4] .................. E05F 3/16; F16D 67/02; H02K 7/112
[52] U.S. Cl. .......................... 310/83; 74/425; 192/8 C; 192/12 BA; 310/76; 310/80; 310/92
[58] Field of Search ............ 74/425; 49/349, 362; 192/8 R, 8 C, 12 B, 12 BA; 310/83, 77, 92, 93, 99, 68 B, 94, 97, 100, 78, 80, 39, 17, 76

[56] References Cited

U.S. PATENT DOCUMENTS

| | | | |
|---|---|---|---|
| 2,922,220 | 1/1960 | Sacchini | 192/8 C |
| 3,011,605 | 12/1961 | Hungerford, Jr. et al. | 192/8 C |
| 3,726,370 | 4/1973 | Hubbard, Jr. | 192/8 C |
| 3,826,934 | 7/1974 | Leach | 310/41 |
| 4,246,991 | 1/1981 | Oldakowski | 192/8 C |
| 4,347,452 | 8/1982 | Imahashi | 310/80 |
| 4,369,387 | 1/1983 | Haar et al. | 310/83 |

FOREIGN PATENT DOCUMENTS

| | | | |
|---|---|---|---|
| 12250 | 6/1980 | European Pat. Off. | 192/8 C |
| 1708310 | 5/1971 | Fed. Rep. of Germany | 310/92 |

*Primary Examiner*—Mark O. Budd
*Assistant Examiner*—D. L. Rebsch
*Attorney, Agent, or Firm*—Donald J. Lenkszus

[57] ABSTRACT

A drive unit for adjusting window panes, sunroofs, and seats in a vehicle has a reversible electric motor behind which is inserted a worm gear with a worm shaft. To prevent an undesired or unauthorized adjustment of a motor vehicle part, a brake device is provided. The brake device has a mechanical, one-way brake element with which the worm shaft may be coupled by an axial displacement. In order to reduce the effect of the brake device on the worm shaft when the window pane is adjusted by the electric motor, the brake element is the rotatable part of a rotation limiting device and, in the axial direction, it is supported on a stop.

30 Claims, 8 Drawing Figures

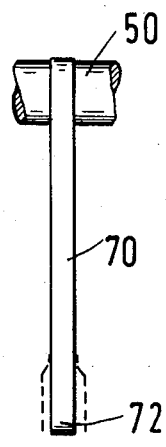
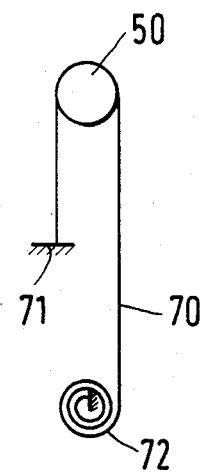
Fig. 8   Fig. 7
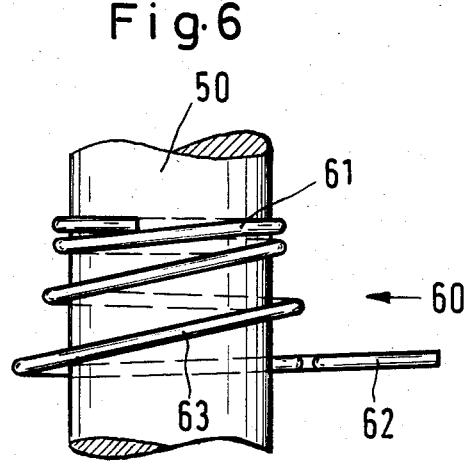
Fig. 6

DRIVE UNIT FOR ADJUSTING WINDOW PANES, SUNROOFS, SEATS AND SIMILAR MOTOR VEHICLE PARTS

BACKGROUND OF THE INVENTION

The invention pertains to a drive unit for adjusting window panes, sunroofs, seats and other motor vehicle parts.

Systems for adjusting window panes, sunroofs, seats and the like in motor vehicles should be constructed such that the motor vehicle part cannot be forcibly adjusted and does not adjust on its own. Thus the system must be constructed in such a way that it does not permit power transmission in a reverse direction. In a scissor-type window lifter this can at least be partially effected in that the scissor occupies a position close to its dead center. In other systems, for example in a cable-operated wndow lifter, other solutions have to be used.

One known drive unit is based on a self-locking worm gear. By using a self-locking worm gear it is assumed that the drive unit cannot be driven from the output side and accordingly automatic displacement of a window pane, a sunroof or a seat would not be possible. This would be so for worm gears mounted on stationary racks. This, however, is not so for worm gears mounted in motor vehicles, because the continuous vibrations and concussions result in movement of the worm gear from the output side. The movement is increased by the flank clearance always appearing between worm wheel and worm shaft. In particular, this occurs where the part to be adjusted contributes to this undesired action with its own weight.

The drive unit of German specification OS No. 1 708 310 utilizes a reversible electric motor behind which is inserted a worm gear with a worm shaft and a worm wheel meshing with the worm. The blocking function of the gear is available even if the worm gear is not entirely self-locking. The worm shaft is mounted such that it is axially adjustable within limits and rests against a stop which resiliently gives way in the axial direction. A brake is associated with the worm shaft. The brake impedes rotation of the worm if, during a reversal of the power transmission from the worm wheel to the worm, the axial thrust overcomes the spring force of the stop and displaces the worm axially. During reversal of the transmission of power, this axial thrust is always greater than the spring force of the stop, so that the brake becomes always effective and the element to be adjusted cannot be moved. The brake includes a friction disk aligned perpendicularly to and mounted on the worm shaft. The disk co-operates with a friction surface formed on a stationary part of the drive unit, when the worm shaft is axially displaced in one direction. Thus the worm shaft is coupled with the stationary part of the unit. This stationary part is thus the brake element.

If the worm shaft of a system is axially displaceable, the resilient stop is necessary to prevent braking of the worm shaft when the window is closed from the drive side. Of course the force of the resilient stop is also effective when the window is opened from the drive side. Then it adds to the force already acting on the worm shaft because of the worm wheel resisting its rotation. This increased axial thrust diminishes the efficiency of the unit and results in increased wear and noise.

SUMMARY OF THE INVENTION

A drive unit in accordance with the invention has increased efficiency, decreased wear and power transmission from the output side is blocked reliably and simply.

In accordance with the invention, the brake element is the rotatable part of a rotation limiting device and is supported in the axial direction on a stop. As a rotatable part of a rotation limiting device, the brake element can rotate in one direction, while it is blocked in the other direction. Upon opening of the window pane or upon adjustment of another part in one direction from the output side, the worm shaft is coupled with the brake element. Rotation of the worm shaft would only be possible if the brake element could rotate in the direction in which it is blocked. However, the brake element cannot thus rotate so that the worm shaft is also blocked. The worm shaft is also coupled with the brake element upon closing the window from the output side. However its direction of rotation is now reversed, so that it can also rotate the brake element without difficulty. It is therefore not necessary to prevent coupling between the worm shaft and the brake element with a resilient support of the worm shaft. Upon opening the window from the drive side, the worm shaft is axially displaced in the other direction and is therefore not coupled with the brake element. Because the worm shaft is not resiliently supported in the axial direction, the only effective axial thrust is produced by the resistance the worm wheel in the opposing rotation. Thus the wear of the drive unit is diminished. Furthermore, a good efficiency is also achieved when a window is opened. In the other axial direction, the worm shaft is supported on a stop by the brake element.

BRIEF DESCRIPTION OF THE DRAWING

The invention will be better understood from a reading of the following detailed description in conjunction with the drawing in which:

FIG. 6 illustrates a portion of a brake shaft having a wrap spring having two different areas of windings;

FIG. 7 is an axial view of a brake shaft with a brake band; and

FIG. 8 is a side view of the brake shaft and of the brake band of FIG. 7.

DETAILED DESCRIPTION

Figure 1:
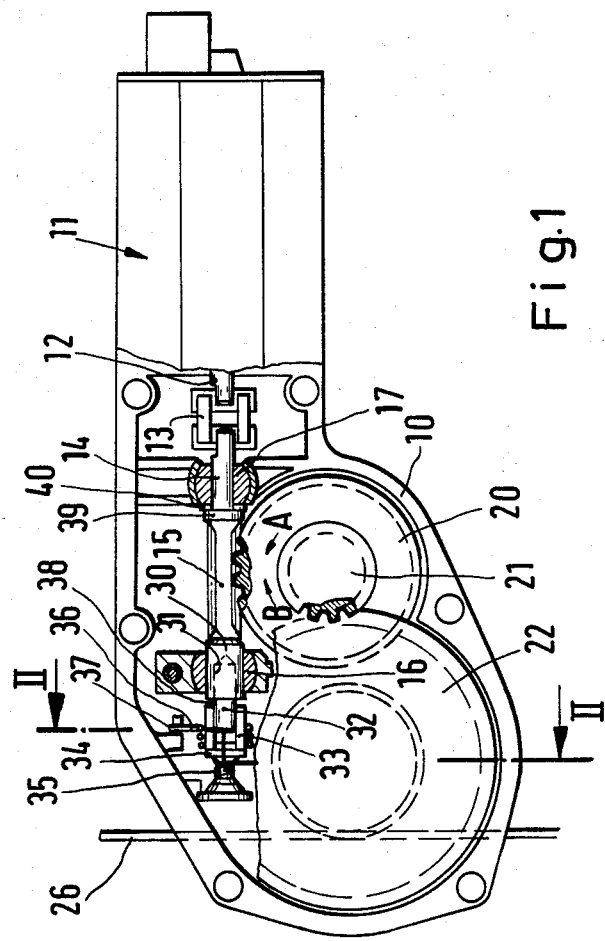
FIG. 1 illustrates a drive unit having a brake element in the shape of a bushing rotatably mounted on the worm shaft.
Figure 2:
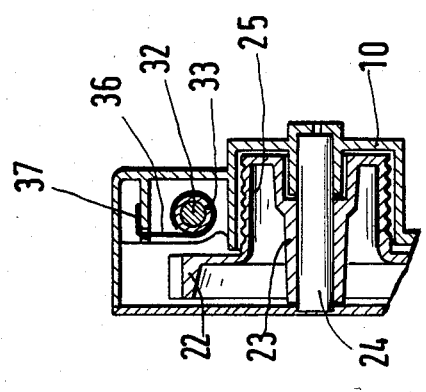
FIG. 2 is a section taken on the line II—II of FIG. 1.

In the drive unit for a window lifter system shown in FIGS. 1 and 2, electric motor 11 is inserted in a housing 10 of plastic material. The armature shaft 12 of electric motor 11 is connected with a worm shaft 14 in a manner protected against twisting by permanent coupling 13. The worm shaft 14 is flush with the armature shaft 12 and in a central area has the shape of a worm, and preferably of a double-thread worm 15. In the axial direction on both sides of worm 15, worm shaft 14 is mounted in two universal ball joint bearings 16 and 17.

The worm 15 meshes with a worm wheel 20. Toothed wheel 21 is arranged on the same axle as worm wheel 20. Toothed wheel 21 meshes with a toothed wheel 22 whose diameter is considerably larger than that of the toothed wheel 21. Toothed wheel 22 is connected in a manner protected against twisting with a shaft 24 by a hub 23. Shaft 24 is rotatably mounted in the housing 10. A drum 25 is formed as a single piece with the toothed wheel 22. A cable 26 can be wound on drum 25 and used for the transmission of motion to a window pane.

Worm shaft 14 includes a bore 31 in the portion 30 which is mounted in the bearing 16. A bearing pin 32 is pressed into bore 31. A bushing 33 is pushed on the bearing pin 32 in a manner permitting free rotation. Bushing 33 forms the brake element of the drive unit as a rotatable part of a rotation limiting device. Bushing 33 is longer than the bearing pin 32. In the front side of bushing 33 (the side of the bushing 33 most distant from the bearing pin 32) a disk 34 is inserted which has a central cam with ball-shaped surface. Bushing 33 is supported by disk 34 on a stop fixed to the housing. An adjusting screw is provided as a stop. Bushing 33 is surrounded by a wrap spring coil brake 36 which has its one end 37 firmly braced on the housing 10. The bracing can for example be effected in that the end 37 of wrap spring 36 is inserted in a slot of the housing 10 and then the plastics material above the end 37 is hot formed. Wrap spring 36 is part of the rotation limiting device and allows the bush to freely rotate in one direction, while blocking the bush from rotation in the other direction. The mounting for the rotation limiting device is formed by the housing 10.

In the position of the worm shaft 14 shown in FIG. 1, bushing 33 is spaced from the shoulder 38 at the end of the portion 30 of the worm shaft 14. Shoulder 38 results from the thinner bearing pin 32. Disk 34 is spaced an even greater distance from bearing pin 32. Thus in this position the worm shaft 14 is not supported on the stop 35. In the other direction it is supported on universal ball joint 17 by a further shoulder 39 and seating ring 40.

The electric motor 11 may be controlled in both directions of rotation. When the window is opened, its armature shaft 12, and with it worm shaft 14, rotate in such a way that worm wheel 20 is driven in the direction of arrow A. Because a torque is necessary for the rotation of the worm wheel 20, worm 15 is subject to an axial thrust in the direction towards the universal ball joint 17. Thus, worm shaft 14 is pressed against the universal ball joint 17. The bushing 33 does not rotate. If, for the purpose of closing the window, the worm shaft rotates in the reverse direction and thereby drives the worm wheel in the direcion of arrow B, worm 15 subject to an axial thrust in the direction towards the bushing 33. It hits bushing 33 with its shoulder 38, thereby being coupled with the bushing and rotating it. This is possible because wrap spring 36 is arranged in such a way that it does not block bushing 33 in this direction of rotation. During rotation the worm shaft 14 is supported on the stop 35 by bushing 33 and disk 34.

Thus during normal operation the function of the drive unit is not affected by the bushing 33.

If the direction of power transmission is reversed and it is attempted to drive worm shaft 14 from worm wheel 20, the coordination between the direction of rotation of the worm wheel 20 and the direction of rotation of the worm shaft 14 remains the same. However, the coordination between the direction of rotation of the worm wheel 20 and the direction of the axial thrust acting upon the worm shaft 14 changes. If the worm wheel 20 is now rotated in the direction of arrow A (in a direction which corresponds to an opening of the window) worm shaft 14 is pressed against bushing 33 by means of its shoulder 38. However, this would also require worm shaft 14 to be rotated in a direction in which the bushing 33 is blocked by the wrap spring 36. The resistance of the bushing 33 against rotating of the worm shaft 14 results in a self-locking of the worm gear, so that the entire gear is reliably blocked. The window can therefore neither open on its own nor can it be opened forcibly.

Figure 3:
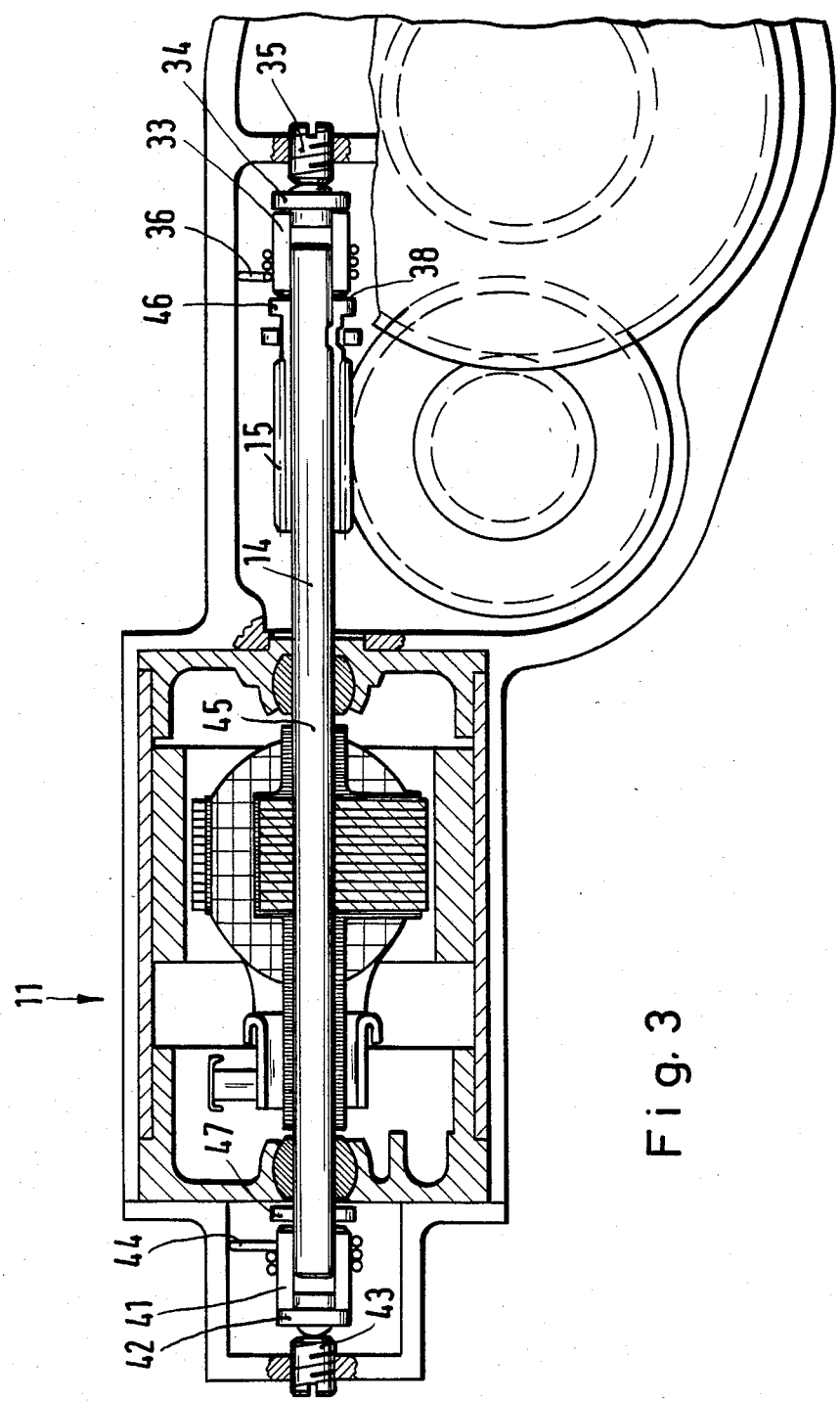
FIG. 3 illustrates a second embodiment of a brake element.

In the embodiment according to FIG. 3 the brake element is also a bushing 33 mounted on the worm shaft 14. Bushing 33 is supported on the stop 35 by disk 34. Bushing 33, in this embodiment, is also surrounded by wrap spring 36. The worm shaft is formed as a single piece with the armature shaft 45 of the electric motor 11. However in this embodiment, the worm 15 is not directly formed out of the worm shaft 14. It is rather pushed on the worm shaft 14 as a separate part and firmly anchored thereon in the direction of rotation and in the axial direction. The separate part is elongated beyond the actual worm and has a flange 46 by which a shoulder 38 is formed which corresponds to the shoulder 38 of the worm shaft 14 in the first embodiment. The worm shaft 14 can hit the bush 33 by this shoulder. Thus the coupling between the worm shaft 14 and the bush 33 is a frictional clutch as in the embodiment of FIG. 1.

A second rotation limiting device is used so that the worm shaft 14 armature 45, and shaft 15 are blocked in each direction of rotation if it is attempted to drive it from the output side. The second rotation limiting device includes bushing 41, disk 42 inserted in bushing 41 to provide a support on an adjusting screw 43, and a wrap spring 44. The second rotation limiting device is substantially identical to the other rotation limiting device. However wrap spring 44 is wound around the bushing 41 in the opposite direction compared to the wrap spring 36 wound around its associated bushing in the embodiment of FIG. 1. Stop disk 47 is firmly connected with shaft 14 and can hit against the bushing 41.

Thus, together with the self-locking characteristics of the worm gear, the first rotation limiting device blocks the shaft 14 in one direction of rotation and the second rotation limiting device blocks shaft 14 in the other direction of rotation. This is why the drive unit is suitable for use where vibrations might adjust the motor vehicle part in one or the other direction, such as, for example, in a system for adjusting a motor vehicle seat or a sunroof.

In the embodiment of FIG. 3 one rotation limiting device is positioned on one of the shaft 14 and the other rotation limiting device is positioned on the other end of the shaft 14. In the embodiment according to FIG. 4 the two rotation limiting devices are arranged directly adjacent to each other on the same side of the worm 15. On the side of the worm 15 not facing the armature of the electric motor, the worm shaft 14 is supported in a universal ball joint 48, which in the axial direction is safely held in the housing 10. Shaft 14 carries the stop disk 47 spaced from worm 15. Between the universal ball joint 48 and the stop disk 47 a bushing 41 is rotatably mounted on the worm shaft 14. Bushing 41 is wrapped by the spring 44. Bushing 41 can be supported on the universal ball joint 48 by an intermediate disk 49.

On the other side of stop disk 47, a bushing 56 is wrapped by a spring 36 and is rotatably mounted on worm shaft 14. In contrast to bushing 33 of FIGS. 1 and 3, bushing 56 is closed to form a single piece on one front side, and thus has a pocket hole 57 into which worm shaft 14 fits. The bushing 56 is supported on the adjusting screw 35 by a ball 58 inserted in a semispherical recess.

As in the embodiment according to FIG. 3, the wrap spring 44 can again block the bushing 41 in one direction, while it permits a free rotation of bushing 41 in the other direction. The wrap spring 36 acts upon the bushing 56 in the same way thereby exchanging the directions of rotation.

Figure 4:
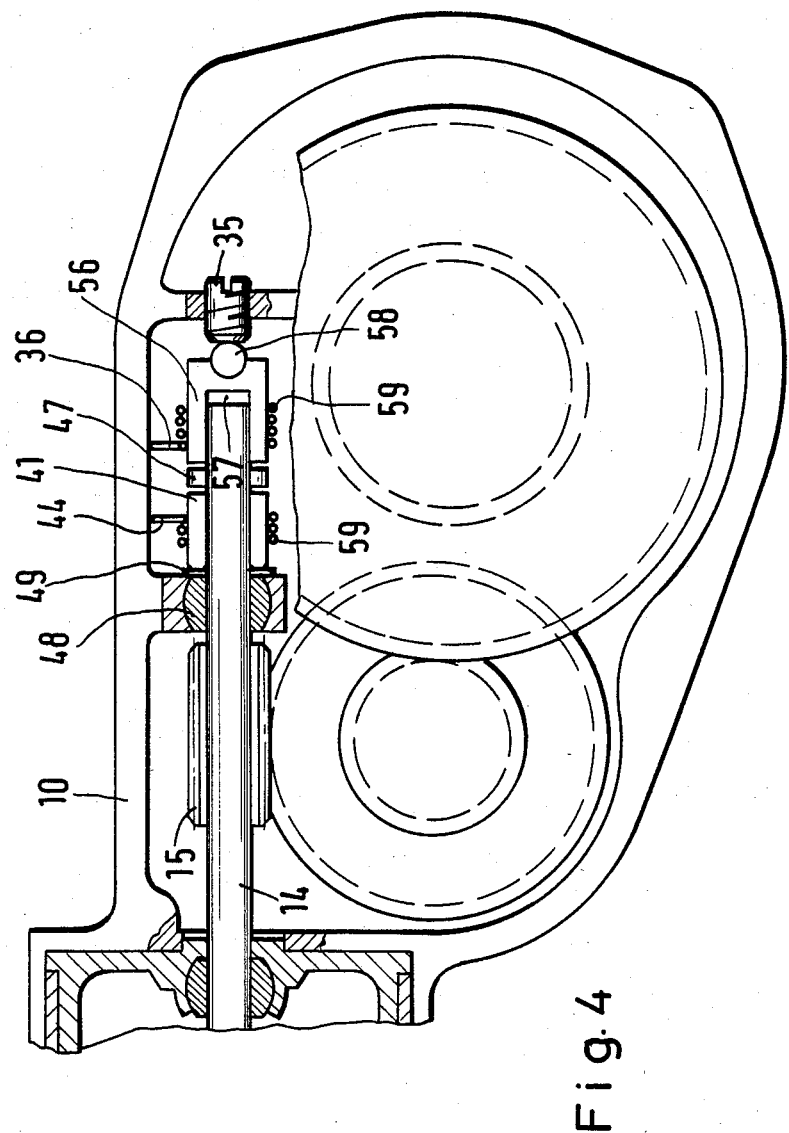
FIG. 4 illustrates a third embodiment having two rotation limiting devices on the same side of the worm.

In contrast to the embodiments of FIG. 1 or 3, in the embodiment of FIG. 4 each bushing 41 and 56 carries an annular flange 59 on whose side is positioned the wrap springs 44 and 36, respectively.

Wrap springs 44 and 36 are formed in such a way and mounted in the housing 10 so that they rest against the associated annular flange 59 and press the respective bushings 41 and 56 with low force against the universal ball joint 48 and the adjusting screw 35 respectively. It is thereby ensured that the stop disk is rapidly detached from the bushing when the direction of rotation is reversed. Moreover, a potential blocking coupling between the shaft 14 and the respective bushing 41 or 56 is prevented to a high degree in one direction of rotation and during normal operation.

Figure 5:
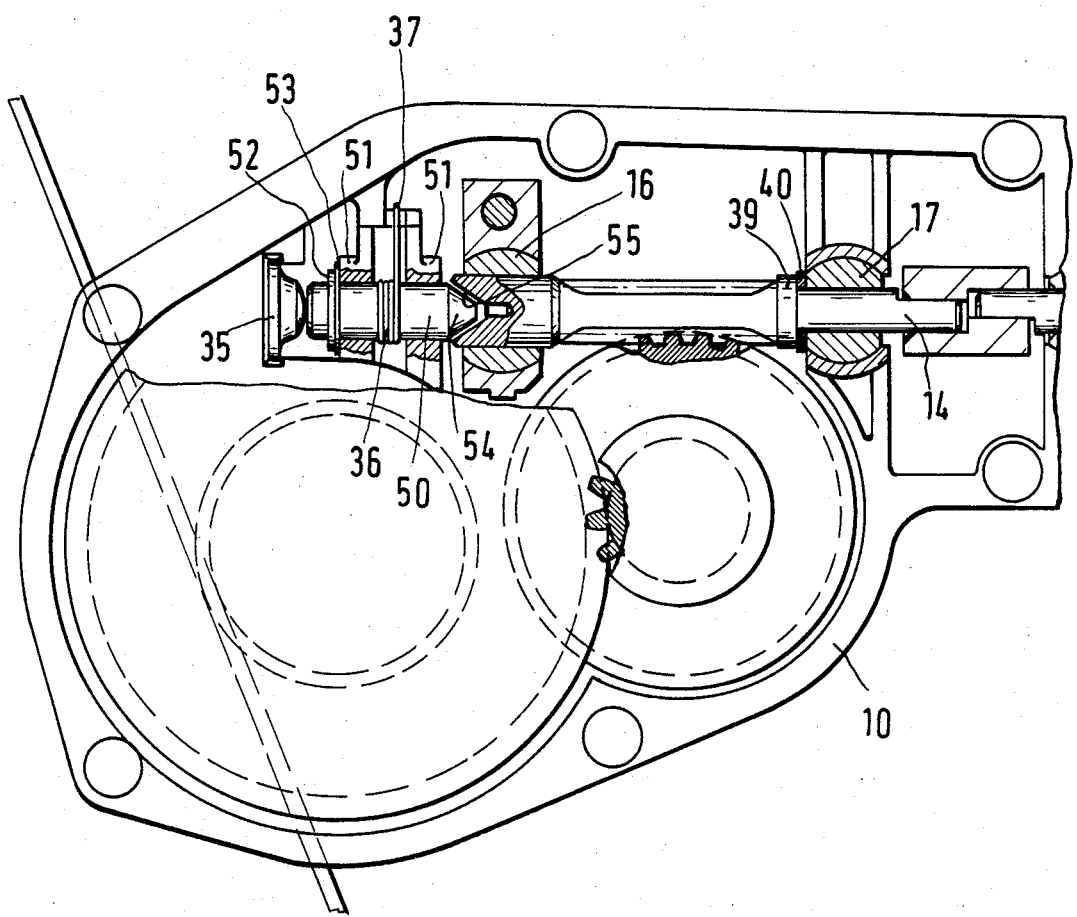
FIG. 5 illustrates a fourth embodiment utilizing a shaft as brake element.

The functioning principles of the embodiment of FIG. 5 is the same as that of the embodiments of FIGS. 1 to 4. In this case too the worm shaft 14 is axially displaceable, whereby in one direction it is supported on the cup-shaped bearing 17 by the shoulder 39 and the washer 40. A bushing mounted on the worm shaft 14 is no longer used as a brake element, but rather a solid shaft 50 is used. Shaft 50 is axially mounted relative to the worm shaft 14, but is rotatable independently of the latter in two bearing eyes 51 of the housing 10. The axis of the bearing eyes must be flush with the axes of the seats of the universal ball joints 16 and 17. Thus the shaft 50 is arranged in axial alignment with the worm shaft. On the side not facing the worm shaft 14 the shaft 50 is also supported on a stop 35. Unlike the bushing 33 of the two preceding embodiments, shaft 50 is not displaceable in the direction towards worm shaft 14. For this purpose, it carries a retainer 52, with which it rests against one bearing eye 51 by a washer 53. Thus the shaft 50 is not displaceable in the axial direction.

The wrap spring 36 surrounds the shaft 50 with its windings in the space between the two bearing eyes 51 and, just as in the preceding examples, is mounted on the housing 10 at its end 37. Facing worm shaft 14, shaft 50 carries a cone-shaped head 54, arranged to fit into a correspondingly shaped bore 55 of the worm shaft 14. If a motor vehicle window is to be closed from the side of the drive, or if the window attempts to open on its own, or if it is attempted to open the window forcibly, the worm shaft 14 and the shaft 50 are connected with each other by a frictional clutch including the cone-shaped surfaces of the head 54 and of the bore 55. In a closing action from the side of the drive, the worm shaft is rotated in one direction, in which the shaft 50 can also freely rotate. In contrast, an attempted opening action from the output side would result in rotating the worm shaft in the other direction. This is prevented by the self-locking of the worm gear and by the blocking of shaft 50 through wrap spring 36. When the window is opened from the side of the drive, the worm shaft 14 is indeed rotated in the same direction in which it would have to be rotated in an opening action from the side of the output, however the direction of the axial thrust is reversed. The worm shaft 14 is therefore not coupled with the shaft 50 and cannot be blocked by it.

In the closing action of the window, worm shaft 14 is coupled with the shaft 50 and rotates it. At the first moment of the rotation when the window is opened, worm shaft 14 is at first decoupled from the shaft 50, in order to then run completely independently of the shaft 50. To insure that shaft 50 affects worm shaft 14 only to a very small extent when the window is opened, a wrap spring 60 according to FIG. 6 can be used. This wrap spring 60 has a first area 61 of windings, in which it closely surrounds the shaft 50 thereby touching it slightly. Closer to the end 62 of the wrap spring 60 the latter has a second area 63 of windings which, in the relaxed condition, have a diameter which is larger than the diameter of the shaft 50. In this area 63 the diameter of the windings tapers in the manner of a cone to the diameter of the windings in the area 61. The area 63 of the wrap spring 60 is intended to ensure that, when the window pane is opened, a small rotary motion of the shaft 50 is possible, so that the worm shaft 14 can detach from the shaft 50 without difficulty.

The necessary rotary motion is so small, that in an attempt to move the motor vehicle part from the output side or in the case of vibrations it has practically no effect on the safe position of the motor vehicle part because of the considerable reduction of the gear.

Instead of a wrap spring, a brake band 70 can also be used for the rotation limiting device, as is shown in FIGS. 7 and 8. This brake band is mounted with its one end on a part 71 fixed on the mount, conducted over a shaft 50 and with its other end connected with a spring 72. Spring 72 is a steel spring and its inner end is fastened on the mount 71. A particularly simple design and assembly is acheived, if the brake band 70 and the spring 72 are made as a single piece of a resilient material. It is therefore not absolutely necessary for the width of the brake band to be the same as the width of the spring. In FIG. 8 it has been indicated by broken lines that, for example, the spring 72 can be broader than the brake band 70.

What is claimed is:

1. A drive unit for adjusting motor vehicle parts, comprising:
   an electric motor having an armature, said motor being operable to rotate said armature in first and second directions;
   a worm gear having a worm shaft coupled to said armature, a worm thread on a portion of said worm shaft, and a worm wheel meshing with said worm thread, said worm shaft being displaceable along its longitudinal axis between first and second limits; and
   a brake device including a brake element coupleable to said worm shaft by axial displacement of said worm shaft in one direction;
   a rotation limiting device admitting rotation of said brake element in one direction and preventing rotation of said brake element in the other direction; and
   a stop supporting said brake element in the axial direction against pressure exerted by said worm shaft.

2. A drive unit in accordance with claim 1, wherein:

said brake element is directly coupled to said worm shaft.

3. A drive unit in accordance with claim 2, wherein:
said brake element is axially arranged relative to said worm shaft and may be freely rotated in relation to said worm shaft.

4. A drive unit in accordance with claim 1, comprising:
a friction clutch between said brake element and said worm shaft.

5. A drive unit in accordance with claim 4, wherein:
said friction clutch comprises cone-shaped friction surfaces.

6. A drive unit in accordance with claim 1, wherein:
said brake element and said worm shaft are at least partially coaxially positioned relative to each other.

7. A drive unit in accordance with claim 6, wherein:
said brake element is directly rotatably mounted on said worm shaft.

8. A drive unit in accordance with claim 6, wherein:
said brake element comprises a shaft which engages in a bore of said worm shaft.

9. A drive unit in accordance with claim 6, wherein:
said brake element comprises a bushing which overlaps said worm shaft.

10. A drive unit in accordance with claim 9, wherein:
said worm shaft includes a bearing pin within said bushing, said bearing pin having a diameter smaller than that of an adjacent portion of said worm shaft, and said worm shaft includes a shoulder by means of which it can axially act upon said bushing.

11. A drive unit in accordance with claim 10, wherein:
said bearing pin is inserted in a bore of said worm shaft.

12. A drive unit in accordance with claim 9, wherein:
said worm thread is a separate part firmly slipped on said worm shaft and a shoulder by means of which said worm shaft can axially act upon said bushing is formed by a front face of said separate part.

13. A drive unit in accordance with claim 9, comprising:
a stop disk mounted on said worm shaft, said worm shaft which stop disk it can axially act upon the bushing.

14. A drive unit in accordance with claim 13, comprising:
a disk inserted in said bushing to support said bushing on said stop.

15. A drive unit in accordance with claim 13, wherein:
said bushing is closed on one side.

16. A drive unit in accordance with claim 15, wherein said bushing comprises a recess on its front side, and a ball body in said recess for supporting said bushing on said stop.

17. A drive unit in accordance with claim 1, wherein:
said brake element is fixed in both axial directions.

18. A drive unit in accordance with claim 1, wherein:
said rotation limiting device comprises a wrap spring through which said brake element may be coupled in one direction of rotation with an immovable part.

19. A drive unit in accordance with claim 18, wherein:
said wrap spring has one end fastened on said part and the turns of said wrap spring and said brake element surround each other coaxially.

20. A drive unit in accordance with claim 19, wherein:
said wrap spring surrounds said brake element with its turn externally.

21. A drive unit in accordance with claim 19, wherein:
said one end of said wrap spring has a bent portion by means of which it grips behind said part.

22. A drive unit in accordance with claim 19, wherein:
said wrap spring has a first area of turns in which it touches said brake element and a second area of turns closer to said one end, in which in relaxed condition of said wrap spring the diameter of the turns is different than the diameter of the contact area of said brake element.

23. A drive unit in accordance with claim 22, wherein:
said second area of said wrap spring is cone-shaped.

24. A drive unit in accordance with claim 17, wherein:
said rotation limiting device includes a brake band having one end fastened on an unmovable part, by which said brake element is guided and having its other end connected with a spring which pulls said brake band, said brake band and said spring being formed as a single piece.

25. A drive unit in accordance with claim 24, wherein:
said spring is a spiral spring.

26. A drive unit in accordance with claim 25, wherein:
said brake element is loaded by said wrap spring or by said brake band in the direction to said stop.

27. A drive unit in accordance with claim 26, wherein:
said brake element has a projection upon which said wrap spring acts.

28. A drive unit in accordance with claim 27, wherein:
said projection is positioned between said wrap spring and said stop and said wrap spring presses axially against said projection.

29. A drive unit in accordance with claim 1, wherein:
a second rotation limiting device having a second brake element to which said worm shaft may be coupled by an axial displacement of said worm shaft in the opposite direction, said second brake element may be blocked in the reverse direction of rotation in comparison with said brake element and,
a stop supporting said second brake element in the opposite axial direction against the pressure of the worm shaft.

30. A drive unit in accordance with claim 29, wherein:
said worm shaft firmly carries a collar;
said brake element is a bushing on one side of said collar; and
said second brake element is a second bushing in the other side of said collar.

* * * * *